United States Patent
Oldenburg

(10) Patent No.: US 6,464,228 B1
(45) Date of Patent: Oct. 15, 2002

(54) METHOD OF USING A RETROFITTABLE SEVERE DUTY SEAL FOR A SHAFT

(75) Inventor: Michael R. Oldenburg, Madelia, MN (US)

(73) Assignee: Transcom, Incorporated, Burnsville, MN (US)

( * ) Notice: Subject to any disclaimer, the term of this patent is extended or adjusted under 35 U.S.C. 154(b) by 43 days.

(21) Appl. No.: 09/618,619

(22) Filed: Jul. 18, 2000

Related U.S. Application Data

(63) Continuation-in-part of application No. 08/937,427, filed on Sep. 25, 1997, now Pat. No. 6,186,507.

(51) Int. Cl.$^7$ ............................. F16J 15/34; F16J 15/32
(52) U.S. Cl. ...................... 277/309; 277/402; 277/562; 277/572
(58) Field of Search .................... 277/309, 353, 277/402, 407, 560, 562, 572

(56) References Cited

U.S. PATENT DOCUMENTS

| | | | |
|---|---|---|---|
| 3,022,081 A | | 2/1962 | Kosatka |
| 3,606,351 A | | 9/1971 | Hallerback |
| 4,285,526 A | * | 8/1981 | Klinteberg et al. |
| 5,042,822 A | | 8/1991 | Dreschmann et al. |
| 5,096,207 A | | 3/1992 | Seeh et al. |
| 5,340,125 A | | 8/1994 | Brown et al. |
| 5,348,312 A | | 9/1994 | Johnston |
| 5,522,600 A | | 6/1996 | Duckwall |
| 5,716,277 A | | 2/1998 | Reynolds |
| 5,944,321 A | * | 8/1999 | Niebling et al. |

* cited by examiner

Primary Examiner—Anthony Knight
Assistant Examiner—Michael J. Kyle
(74) Attorney, Agent, or Firm—Dorsey & Whitney LLP

(57) ABSTRACT

The present invention discloses a method of sealing dynamic shaft applications. The method comprises providing a dynamic shaft assembly containing a bore for receiving a seal, providing a unitized seal, and placing the unitized seal on the shaft, thus sealing the assembly so that lubricants may not escape, and foreign material may not enter. The unitized seal can provide permanently lubricated sealed bearings in severe service conditions such as rollers and idlers of track-driven vehicles and agricultural equipment.

18 Claims, 3 Drawing Sheets

METHOD OF USING A RETROFITTABLE SEVERE DUTY SEAL FOR A SHAFT

RELATED APPLICATIONS

This Application is a Continuation-in-Part of U.S. patent application Ser. No. 08/937,427, filed Sep. 25, 1997 now issued as U.S. Pat. No. 6,186,507, issued Feb. 13, 2001, entitled "Retrofittable Severe Duty Seal For A Shaft," to Michael R. Oldenburg.

TECHNICAL FIELD

The present disclosure is related to the field of seals for sealing dynamic shafts, generally, and methods of using the same. The methods and apparatus are particularly related to the field of unitary combination lip and sleeve seals. More specifically, this is a method for using an improved seal adapted for use in severe duty applications including construction equipment, agricultural machinery, track driven vehicles, and other applications where oil or grease must be held in contact with dynamic shaft assemblies. This seal and other seals of this type must also operate as excluder seals to keep lubricated surfaces free from corrosives, acids, other chemicals, dirt, mud, dust, abrasives, water and other contaminants. Even more particularly, this seal incorporates design features that enhance performance (compared to usual original equipment seals) when installed on shafts that have been slightly damaged by normal wear. Most specifically, this seal can be used as a roller or idler seal for track driven vehicles.

BACKGROUND

The method of using the present seal structure yields a very important benefit that has eluded other persons skilled in the art. It can be retrofitted to existing, worn machinery to enhance the protection of costly lubricated machine components. This seal can replace existing seals, and the performance of this seal exceeds that of all other standard-sized, commercially available, conventional, lip and sleeve type seals. The only commercially available type of seal with performance comparable to this embodiment is the dual cone face seal. It is known by those in the art that dual cone face seals have disadvantages that significantly restrict their use. The seal disclosed here overcomes the two major inherent disadvantages of dual cone face seals—overall width and high cost.

Conventional unitized lip and sleeve seals are much thinner than dual cone face seals. Since this seal can be installed as a direct replacement for ordinary seals, it can be specified and used without making any modifications to the design of an existing machine. The shaft, the bore, and the housing in which the seal operates are identical whether the present seal or conventional seals are used. Wherever dual cone face seals are desired, the machine must have been originally designed specifically for their use. They cannot fit all of the machine locations because of design constraints.

However, the availability of a seal having the superior performance characteristics of an embodiment according to the present disclosure in a package the size of ordinary seals gives additional freedom to designers of heavy machinery and severe duty assemblies. Many new design possibilities are made available by this seal because of the unitized style of the seal and the small width requirements as compared to dual cone face seals.

The selling price a seal according to the present disclosure is substantially less than the selling price of dual cone face seals. A preferred embodiment of the present disclosure is expected to be two to three times the cost of a conventional seal. In some applications, such as crawler vehicles, which currently use dual cone face seals, a single machine will typically require 40 to 60 roller seals, each of which is subjected to extremes of heat, cold, moisture, dust, abrasives, acids and alkalis. Replacing the 40 to 60 dual cone face seals with seals according to the present disclosure will result in substantial savings without deviating from quality.

An important benefit of the method of using the seal disclosed is that it can create permanently lubricated shaft and bearing assemblies that can withstand severe use. The method of using this seal may enable equipment manufacturers to improve the performance of their machinery by reducing maintenance requirements. It is believed that existing vehicles and other machines can be retrofitted advantageously by replacing the original regreasable seals with this new permanently lubricated seal. The lifetime of the new seal can last substantially longer than current lip seals. It is to be understood, however, that the present seal can be used to seal in either oil or grease and to substantially exclude all environmental contaminants that do not attack the materials from which the seal is manufactured.

It is an object of the invention to accomplish the foregoing and to teach the structure and method of using a retrofittable severe duty seal for a shaft.

It is a further object of this disclosure to show a method useful for sealing bearings in shaft-mounted dynamic rollers used in track-driven vehicles.

Another object is to provide a method that may be useful in any application where a shaft and shaft bearing or bushing surfaces may be exposed to mud, dust, abrasives, cement, submersion, abrasive liquids or other substances that could damage relative dynamic mechanical components.

Another object hereof is to disclose a method of using a seal that lasts longer than previously known low cost seals adapted for severe duty applications.

Another object of the present disclosure is to make essentially all of the important benefits of a dual cone face seal available at a much lower cost.

Yet another object hereof is to make essentially all of the important benefits of a dual cone face seal available in a physically smaller assembly.

It is an object to make essentially all of the important benefits of a dual cone face seal available in an assembly having the same physical dimensions as a conventional single lip or double lip seal.

Another object hereof is to provide a method for sealing a shaft and bearing assembly using a seal as an excluder seal, as a grease seal, as an oil seal, and as a seal for other liquids at low and moderate pressures.

Another object of this disclosure is to provide a method for using a seal having a shaft-contacting sleeve that enables the seal to be installed on and to operate reliably with shafts having imperfections such as those ordinarily caused by wear and use.

Another specific object is to provide a method of sealing a shaft and bearing assembly, using an unitary seal structure that both improves reliability, and makes seal installation easier compared to installation of seals that are composed of two or more separable parts.

A further object is to provide a method of using a seal with sealing elements that includes: a main sealing lip with a garter spring that biases the main sealing lip against the outside of the sleeve, at least one dust lip that contacts the sleeve, at least one dust lip that contacts the inner surface of the housing, at least one face dust lip that contacts the inner surface of the faceplate, and an elastomeric, shaft-contacting faceplate ring.

These and further objects of the apparatus taught in accordance with this specification, the claims, and the appended drawing figures are set forth below.

SUMMARY

The present disclosure shows a method using a retrofittable, radial lip seal for sealing a paired shaft and bore assembly rotatable with respect to one another, the seal having a sleeve that may be disposed coaxially on the shaft. The sleeve has an inner end (oil or grease side) that would normally be in contact with the grease, oil, or other fluid to be contained within a housing, an outer end (dirt side) opposite, a bore that has an elastomeric coating, and a sleeve flange extending radially outward from the outer end of the sleeve and generally perpendicular to the sleeve axis. The sleeve flange is terminated with an outer edge. One or more circular elastomeric faceplate-contacting lips extend coaxially opposite the oil side from the sleeve flange outer face.

A circular elastomeric perimeter lip extends radially and outwardly from the outer edge of the sleeve flange to contact a generally cylindrical hollow seal case adapted for fitting into a bore, such as a bore that is formed through a roller end plate, the wall of a housing, or other securement.

The case is formed from a generally cylindrical case body having an outside surface, or outside diameter, that may be disposed within a bore and in contact with the wall of the bore. An elastomeric coating may be affixed to the outside of the case body. By coating the outside of the metal case body with an elastomeric coating or layer, it is possible for the seal to securely fit a bore that has become slightly damaged through use.

The inner surface of the case is smoothly finished in the region close to the outer end to properly adapt it for maintaining continuous operating contact with the perimeter lip of the sleeve flange. The case has an inner, fluid-contacting, end opposite the outer end; the inner end is sometimes referred to as the "oil side." A case skirt extends radially outward from, and generally perpendicular to, the outside end of the case. Although it is believed preferable to form the case skirt from the case body, it may be possible to form the case skirt by attaching a separate piece. Various processes such as drawing, coining, or forging may be employed to make the case body and the case skirt as a unit from a single piece of cylindrical tubular material. An equivalent case body and case skirt assembly may also be formed by joining separate component parts.

A case inner flange is located between the outer end and the fluid end of the case. The case inner flange extends radially inwardly from, and generally perpendicular to, the longitudinal axis of the inside of the case. It is believed preferable to draw the case inner flange from the material of the case body. When formed in that manner, the material of the case body is doubled back on itself to yield two thicknesses of the case material for the distance between the case inner end and the case inner flange. The case reinforcement provided by the double layer of metal allows the use of a slightly thinner material to form the case body than would be necessary if the case material was a single thickness. Other methods of construction may be adopted, however, without departing from the scope of the invention disclosed. For example, a case inner flange could be formed from a cup-shaped blank that is inserted into the case body and secured in place.

At least one sleeve-contacting, elastomeric, sealing lip extends from the case inner flange to operatively contact the outer surface of the sleeve at a region near the inner end of the sleeve. The main sealing lip may be fitted with a garter spring to enable the assembly to operate at higher pressures. Testing has confirmed that the seal disclosed herein can operate reliably at a pressure of one atmosphere (15 p.s.i.) with shaft speeds of 1500 feet per minute.

The maximum pressure at which this seal, like seals in general, can reliably operate decreases with increasing shaft speed. Testing may show that operation is satisfactory at pressures of approximately 100 p.s.i. or that slight changes could allow the seal to operate in the range of 100 p.s.i. However, testing at higher pressures and rotational velocities had not been concluded before preparation of the present disclosure.

The main sealing lip and garter spring portion extends inwardly, toward the inner end of the sleeve, coaxially with the sleeve. At least one, and preferably two dust lips are positioned to extend inwardly from the case into coaxial contact with the sleeve outer surface. One of the inwardly oriented dust lips, the mid-sleeve dust lip, may be disposed generally between the case inner flange aperture and the sleeve outer surface. The second sleeve contacting dust lip, the forward sleeve dust lip, is disposed generally midway between the sleeve flange and the case inner flange. A third dust lip, the case flange dust lip, extends forwardly from the front surface of the case inner flange. The three dust lips and the main sealing lip are molded at high temperatures in one piece using a single mold operation and bonded to the insert with suitable bonding agents.

A resilient layer may cover the outside of the case to improve sealing in conditions where soft, damaged, or other less than optimal bore conditions exist that would impair reliable sealing with a steel outer case surface. It is possible to cover the oil side insert and form the primary seal element similarly. In applications that might expose the sealed materials to corrosion, it is preferred to cover with resilient rubberized material all of the portions of the seal case that are likely to contact the corrosive agents.

The case elastomeric coating is formed with a chamfer to minimize the likelihood that the seal will be damaged during installation. One or more optional radial case relief channels may be formed in the case elastomeric coating. A relief channel may reduce relieves the tendency of the elastomeric coating to form a bulge that could cause the seal to become unseated and move axially after installation. It is also possible to provide radial ribs on the outer surface of the case elastomeric coating for the purpose of providing desired installation properties.

The seal is made into a unitary structure by inserting the sleeve inner end through the case inner flange so that the sleeve flange is inside the case near the case skirt. All of the voids between the lips, and the voids between the lips and the case, must be packed with grease before final assembly of the seal. The faceplate is then attached to the case skirt thereby retaining the sleeve within the case portion. It has been found that a high quality water-resistant grease is needed. One satisfactory grease is made by Esso Corporation and sold under the trade name "BEACON 325" although other products may serve quite satisfactorily. The faceplate is attached to the case skirt and disposed in contact with the face lips that extend axially from the face of the sleeve flange and packed with grease. Although it is believed preferable to attach the faceplate to the case by crimping the peripheral edge of the faceplate around the outer edge of the case skirt, the faceplate may also be attached to the skirt by brazing, welding, adhesive bonding, or by any other of the usual means of connecting such items. It is desired that the junction between the case skirt and the faceplate be impervious to external contaminants and internal lubricants at the temperatures, pressures, and other conditions in which the seal is operated.

A generally planar circular faceplate has an inside surface, an outside surface, and a central aperture slightly larger than the inside diameter of the sleeve. The plane of the inner faceplate surface is disposed generally parallel to the case skirt and the face of the sleeve flange. An elastomeric portion, or faceplate wiper ring, can be attached to the faceplate at the central aperture so that the faceplate wiper ring extends between the faceplate and the shaft. The faceplate wiper ring has an internal diameter that allows it to contact the shaft and thereby exclude contaminants from the remainder of the seal and the sealed components.

The sleeve bore is preferably coated with an elastomeric, or rubberized, coating to make it possible to obtain adequate sealing performance when the shaft condition is substandard due to wear, eccentricity, or other causes. A sleeve radial channel may be formed generally midway between the sleeve inner end and the sleeve outer end. The channel relieves shear tension that may develop during installation. The result is that it is easier to install the sleeve and the potential for damage to the sleeve during installation is reduced.

Chamfers are provided at both the inner end and at the outer end of the sleeve bore to reduce the potential for damage to the seal, the shaft, or the housing during installation. In addition, the inner end of the case outer surface is chamfered to make insertion of the sleeve through the housing easier and less likely to damage the dust lips or other components.

The flange peripheral lip and face lips may be formed in the same molding operation that is used to mold the sleeve bore elastomeric coating. The face lips may be designed with shapes similar to those of the peripheral lip and the three dust lips. However, an alternative design for the face lips is disclosed herein. The undercut face lips are adapted to provide superior performance in severe duty operating conditions. The advantage accrues because the undercut lip inside surface responds with increasing pressure in response to contact with materials that would penetrate the seal. The other lips contact the mating seal surface at distinctly different approach angles and with quite different elastomer shapes and configurations.

An alternative form of the embodiment replacing the main sealing lip is favored for some very dirty applications, such as in agricultural machinery, or in applications where the width of the seal is severely limited due to the assembly configuration. One example in which the alternative embodiment of the seal can be used is in cultivator hub wheels. This type of equipment does not typically have much room for a seal around the bearing, and contains only grease in the assembly. In the alternative embodiment, the main sealing lip and the garter spring are replaced by at least one radial wiper, or excluder lip. In addition, the two sleeve contacting dust lips may also be eliminated in this alternative embodiment. The flat lip design may be less susceptible to catastrophic damage by the infiltration of small amounts of foreign materials than are the usual main seal lip and garter spring sets. It is also possible to produce the design with more lips; for example, a triple or quadruple lip design may be desired in some applications. Eliminating the garter spring and main sealing lip portions allows the seal to have a width of 5 mm inside the bore. This seal replaces typical triple lip seals commonly used in such applications, wherein the sealed portion must constantly be filled with grease to force out the grease, because it has either leaked out, or contains foreign material (e.g., dirt, dust, etc.), because those seals do not effectively keep the materials out. In contrast, the seal of the alternative embodiment does not have to be regreased, and is virtually maintenance free, because it effectively excludes foreign material from entering the sealed area, and does not allow the grease to leak out of the sealed area.

It is preferred to have the inner side of the faceplate smoothly finished to reduce wear on the face lips of the seal. Likewise, the outer surface of the sleeve, the sleeve flange inner face, and the perimeter lip-contacting medial insert inside cylindrical surface may be finished to a condition of low surface roughness to reduce the amount of wear to which the various elastomeric excluder and seal lips are subjected. For this reason, it is generally preferred to make the sleeve, case, and faceplate of metal such as stainless steel, carbon steel, or similar materials. It is to be understood, however, that the sleeve, case, and faceplate may be made from other metals and also from non-metallic materials.

In seals of this nature, the seals are normally described by reference to the cross-sectional configuration. The seal of the present embodiment may readily be manufactured in sizes between 0.5 inches and 26 inches with other sizes available on request. By way of example only and without any limitation on the configuration of embodiments of this disclosure, a representative seal may have an inside (shaft) diameter of 3⅛", an outside (bore) diameter of 4⅛", with an overall width of about 1". The various dimensions do not scale proportionately. For example, the same type of seal may be manufactured for a 6¼" shaft diameter but still have an overall width of 1" and be designed to fit into a 7¾" bore. Seals adapted to various purposes may vary in width from less than ⅛" to over 1" but generally have a width between ¼" and ¾".

It is to be understood, as well, that many different formulations of the elastomeric, or rubberized, elements may function satisfactorily. Viton®, nitrile, carboxylated nitrile, polyacrylate, ACM, fluroelastomers, and silicone compounds are known to provide useful operational characteristics when adapted for incorporation within the seal presently disclosed. Other materials may also be incorporated to confer chemical resistance, extreme temperature resistance, expanded operating pressure range, wear resistance, or other desired properties to the final seal assembly.

DETAILED DESCRIPTION

Figure 1:
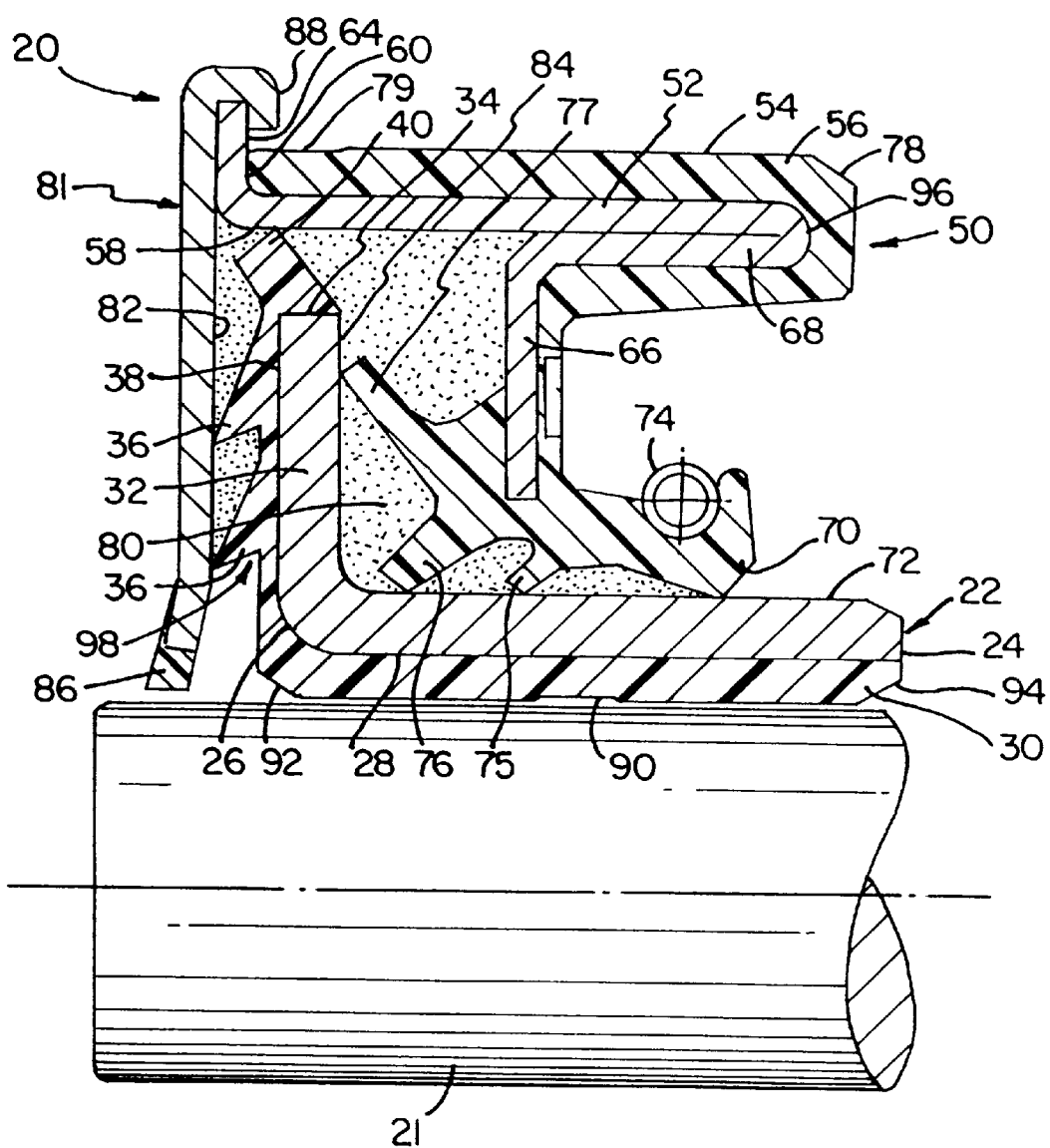
FIG. 1 shows a cross-sectional profile of a retrofittable severe duty seal for a shaft according to the present disclosure.

Referring now to the various figures of the accompanying drawing, FIG. 1 depicts a cross-sectional profile of an embodiment of the retrofittable severe duty seal 20 fitted onto a shaft 21. A cylindrical sleeve 22 component is disposed coaxially over, and in contact with, the shaft 21 so that when installation is complete, the sleeve 22 is affixed to the shaft 21. The sleeve inner end 24 extends into the sealed region, normally a housing or containment for oil or grease used to lubricate gears, bearings, or other moving parts.

To simplify nomenclature in this specification, the side or end or surface of a component that is oriented toward the lubricants, lubricated components, or other media from which it is desired to exclude dust, water, mud, and other environmental contaminants may be referred to using the terms "inner," "inward," "inside," and similar terms. The words "outer," "outward," "outside" and similar terms may be used to refer to a side, end, or surface of a component that is oriented away from the sealed region, toward the exterior of a housing, or toward the unsealed overall environment into which a shaft extends.

Between the sleeve inner end 24 and the sleeve outer end 26, the sleeve bore 28 may optionally be coated with an elastomeric coating 30. The optional sleeve bore elastomeric coating 30 is desirable because it may prevent leakage from between the seal 20 and the shaft 21 even when the shaft is worn, damaged, or otherwise imperfect.

The sleeve flange 32 extends radially outwardly from th sleeve outer end 26 and has a sleeve flange outer edge 34 at its outer periphery. At least one, and preferably two, face lips 36 extend coaxially outwardly from the sleeve flange 32 outer face 38 and a perimeter lip 40 extends radially outwardly from the sleeve flange outer edge 34. The sleeve bore elastomeric coating 30, the face lips 36, and the perimeter lip 40 may be integrally formed and bonded to the sleeve 22 in a single injection molding operation.

A seal case 50 is disposed coaxially outside the sleeve 22. The seal case 50 has a generally cylindrical case body 52 designed so that the case outside surface 54 can fit into and seal against a bore in a housing or flange through which the shaft 21 to be sealed extends. It is preferred to enclose the case outside surface 54 with an optional case elastomeric coating 56. The seal 20 is less likely to leak when installed in a damaged bore if the optional case elastomeric coating 56 is provided. The case body 52 has a case inner surface 58 that may be smoothly finished in the region near the case outer end 60 if the perimeter lip 40 will contact it.

The case inner end 62 is axially opposite the case outer end 60 and the case skirt 64 that extends radially outwardly from the case outer end 60.

A case inner flange 66 extends radially inwardly from the case body 52 toward the sleeve 22. The case inner flange 66 has a circular central aperture through which the shaft 21 and sleeve 22 fit. When the case inner flange 66 is drawn or otherwise made from the case body 52 it is possible to simultaneously form a case reinforcement 68 with a double layer of the material from which the case body 52 is made.

The main sealing lip 70 attaches to the case inner flange 66 and extends both axially inwardly and radially inward from the case inner flange 66. The main sealing lip 70 contacts the sleeve outer surface 72 to form the primary sealing element by which the contents of the sealed volume are prevented from transferring to the outside of the assembly. The main sealing lip 70 is optionally biased against the sleeve outer surface 72 by a garter spring 74. The sleeve outer surface 72 may be polished or otherwise finished to reduce wear of the main sealing lip 70.

Additional sealing elements are situated axially outwardly from the main sealing lip 70. These additional dust lips may extend between the case body 52, particularly the case inner flange 66, and the sleeve outer surface 72.

A mid-sleeve dust lip 75 may be located generally between the case inner flange 66 and the sleeve outer surface 72. A forward sleeve dust lip 76 may be disposed against the sleeve outer surface 72 at a location close to the sleeve flange 32. A case flange dust lip 77 may extend from the case inner flange 66 to contact the sleeve flange 32. The case elastomeric coating 56, the main sealing lip 70, the mid-sleeve dust lip 75, the forward sleeve dust lip 76 and the case flange dust lip 77 may be integrally formed and bonded to the case body 52 and case inner flange 66 in a single injection molding operation.

On the inner end of the case body 52, the case elastomeric coating 56 is finished with a case elastomeric coating chamfer 78 to make it easier to install the seal 20 without distortion or damage. A case outside diameter relief channel 79 is formed in the case elastomeric coating 56. The optional relief channel 79 relieves axial shear stresses from the case elastomeric coating 56 that may be induced by the process of installing the seal 20 into a bore.

Three main sub-assemblies, the sleeve 22, the case 50, and the faceplate 81 are interconnected to form a complete seal 20. These three sub-assemblies are normally made primarily of steel or other metal that is shaped, worked, and polished using conventional metalworking techniques and commercially available equipment. It may be advantageous to smooth the metal surfaces that are contacted by the various elastomeric components to obtain a metal finish having low surface roughness. Carefully shaped and molded elastomeric compounds are bonded to the metal components in the configurations shown in the accompanying drawing. It is possible to form the elastomeric components and attach them to the metal structures in a variety of ways; however, injection molding is believed preferable for these purposes.

Final assembly of the seal 20 is performed by carrying out four additional steps. First, water-resistant grease 80, such as Esso Beacon 325™ is packed to fill all of the voids between the lips and between the case inner flange 66 and the case skirt 64. Second, the sleeve 22 is inserted into the seal case 50 so that the sleeve flange dust lip 77 contacts the sleeve flange 32 and the perimeter lip 40 contacts the perimeter lip-contacting case inner surface 58. Third, grease 80 is packed into the interstices between the individual face lips 36 and also between the perimeter lip 40 and the outermost of the face lips 36. Fourth, the faceplate 81 is affixed to the case skirt 64 by crimping or other means to complete the assembly and unitizing process.

After the faceplate 81 is attached to the case skirt 64, the faceplate inner side 82 contacts the face lips 36 and the sleeve flange inner face 84 is brought into contact with the case flange dust lip 77.

An optional elastomeric faceplate wiper ring 86 can be bonded to a central aperture in the faceplate 81 coaxial with, and through which, the shaft 21 extends. The periphery of the faceplate 81 may be finished with a peripheral faceplate crimp edge 88 for crimping over the case skirt 64 when the faceplate 81 is attached by crimping.

A sleeve radial channel 90 is preferably formed within the sleeve bore elastomeric coating 30 to relieve shear as the seal 20 is fitted to a shaft. The sleeve 22 is finished with a sleeve outer end chamfer 92 and a sleeve inner end chamfer 94 to reduce the potential for tearing of the sleeve bore elastomeric coating 30 and for distortion of the sleeve 22 during installation of the seal 20. Likewise, the seal case 50 may be fitted with a case inner end chamfer 96 to reduce damage to the case elastomeric coating 56 when the case is fitted with elastomeric coating and to prevent case distortion in embodiments without case elastomeric coating 56.

It is believed preferable for the face lips 36 to be sharply angled radially inwardly with an acute point at the innermost portion of each of the face lips 36. In order to form a lip having such a shape, it may be necessary to include a face lip undercut angle 98 that is less than 90 degrees to obtain the desired performance characteristics. The face lips 36 may be formed having a generally triangular cross-section.

Figure 2:
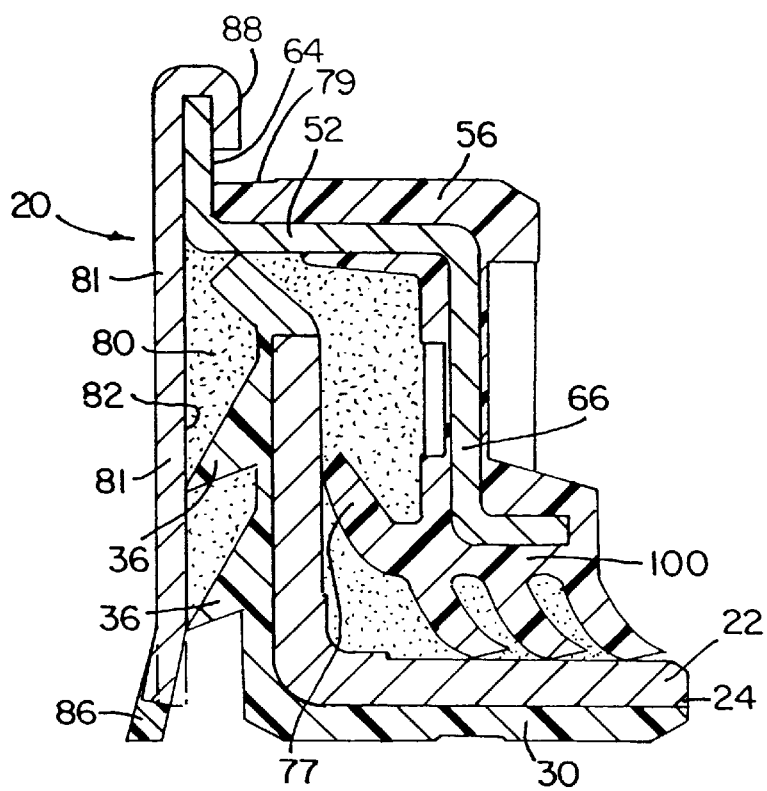
FIG. 2 shows a cross-sectional profile of an alternative embodiment of the retrofittable severe duty seal for a shaft of FIG. 1 having an alternative configuration for the main sealing lip.

FIG. 2 shows an embodiment wherein the single main sealing lip 70 and garter spring 74 shown in FIG. 1 are replaced with a triple lip main seal 100. It may be desirable to also eliminate the mid-sleeve dust lip 75 and the forward sleeve dust lip 76 from embodiments having the main sealing lip 70 replaced by the triple lip main seal 100. This embodiment is especially useful for situations in which the space allowed for a seal in the assembly is less than approximately ¼", and where the lubricant contained in the sealed area is grease, such as in cultivator hub wheels.

Figure 3:
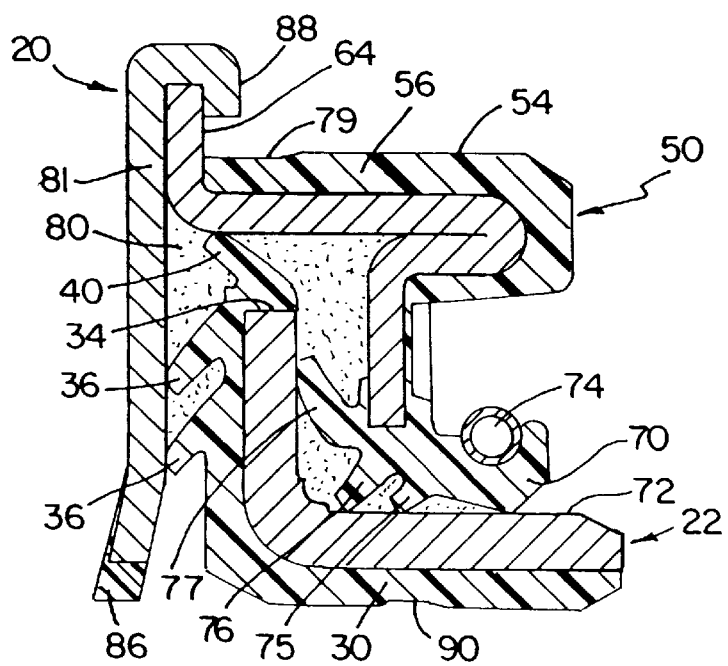
FIG. 3 shows an alternative configuration of the seal of FIG. 1 that has an alternative shape for the face lips.

FIG. 3 shows an alternative embodiment of the seal 20 wherein the spacing relationship between the dust lips 75 76 77 is modified slightly from the relationship depicted in FIG. 1.

Figure 4:
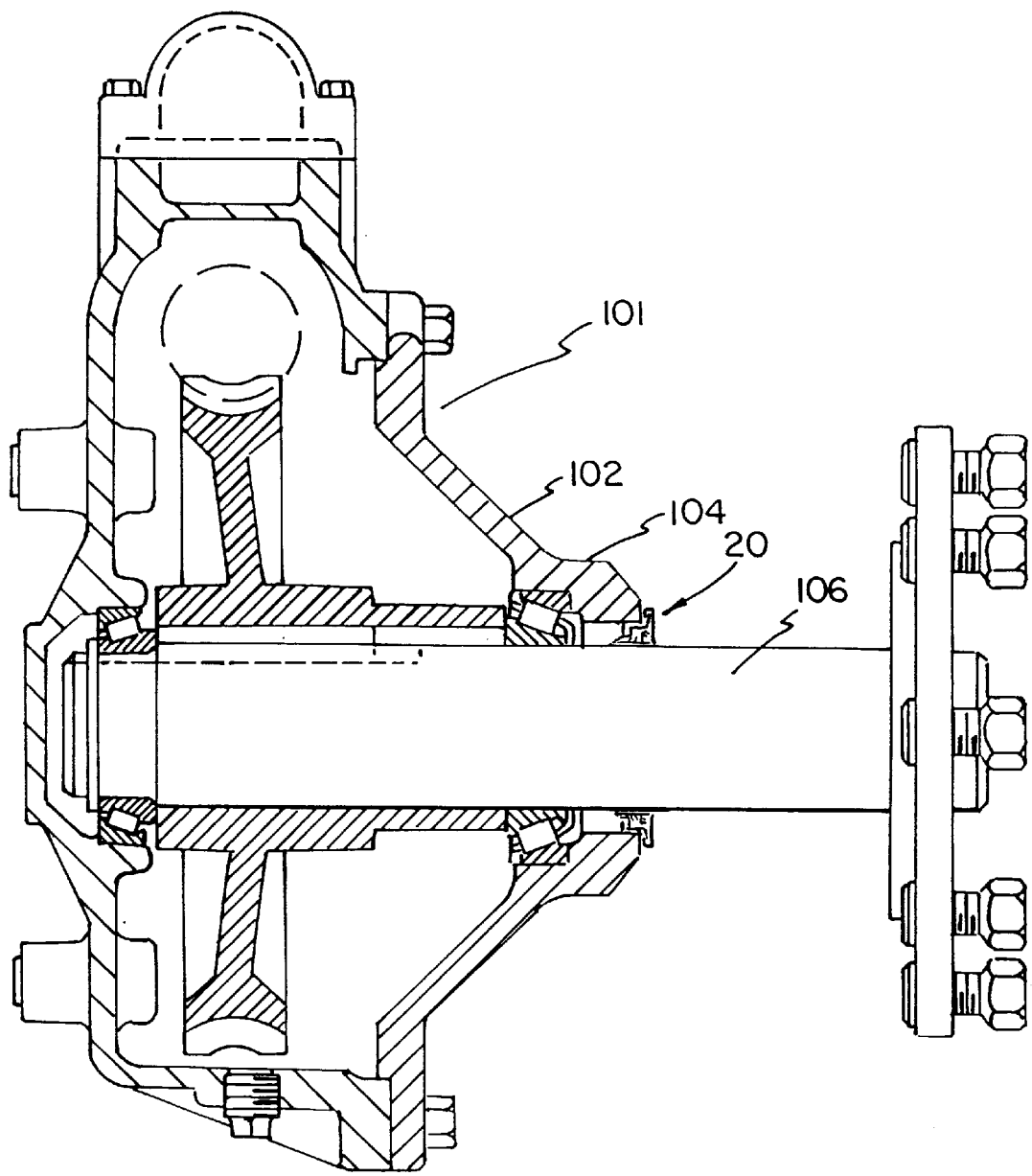
FIG. 4 shows a representative assembly of a type that is adapted for receiving the retrofittable seal of FIG. 1.

FIG. 4 shows a representative application in which the seal 20 may be installed, specifically, a worm gear drive assembly 101. The seal 20 is fitted into the bore of a housing 102 to seal a bearing 104 from outside contaminants and to prevent lubricants from leaking out of the housing 102 around the output shaft 106 of the worm gear drive assembly 101.

INDUSTRIAL APPLICABILITY

From the foregoing, it may be readily understood by those skilled in the art that the embodiments disclosed are applicable to industry and mechanical power transmission generally, and to machinery and vehicles that are operated in severe environments, particularly. Incorporation of the prevent embodiment into new and existing equipment is expected to substantially reduce the maintenance requirements of many types of construction and agricultural equipment.

To use the seals as described, a dynamic shaft assembly is provided, wherein a housing containing the assembly has a bore through which the assembly extends. A seal 20 as described above is coaxially fitted onto the shaft, and is designed so that the case body 52 can fit into and seal against the bore, thus sealing the bearing, and preventing lubricants from escaping the assembly, and foreign materials from entering.

Changes and modifications in the specifically described embodiments can be carried out without departing from the scope of the invention which is intended to be limited only by the scope of the appended claims.

With regard to means for fastening, mounting, attaching or connecting the components of the present invention to form the seal as a whole, unless specifically described otherwise, such means are intended to encompass conventional fasteners such as nut and bolt-type connectors, threaded connectors, snap members, clamps and the like, rivets, toggles, pins and the like. Components may also be connected by welding, friction fitting or deformation, if appropriate. Electrical connections, if any, for use in or during the process, may be made using appropriate electrical components and connection methods, including conventional components and connectors. Suitable computers, microprocessors and the like may be used in the method. Unless specifically otherwise disclosed or taught, materials for making components of the present invention are selected from appropriate materials such as metal, metallic alloys, fibers, plastics and the like, and appropriate manufacturing or production methods including casting, extruding, molding and machining may be used.

Any references to front and back, right and left, top and bottom and upper and lower are intended for convenience of description, not to limit the present invention or its components to any one positional or spacial orientation.

I claim:

1. A method for sealing a dynamic shaft assembly containing a bore for receiving a seal, the method comprising:
   providing a seal having a faceplate and at least one face lip between an inner and an outer portion of the seal, the at least one face lip extending radially inwardly and contacting the faceplate at the innermost point;
   providing a first flange and a perimeter lip in the seal, the first flange extending radially outwardly from the inner portion, and the perimeter lip extending radially outwardly from the first flange, wherein the at least one face lip and the perimeter lip are constructed at least in part of an elastomeric material;
   providing a main sealing lip in the seal, the main sealing lip biased against the inner portion by a garter spring; and
   placing the seal into the bore.

2. The method of claim 1, further comprising providing a main sealing lip in the seal, the main sealing lip contacting the inner portion.

3. The method of claim 2, further comprising biasing the main sealing lip against the inner portion.

4. The method of claim 2, further comprising biasing the main sealing lip with a garter spring.

5. The method of claim 1, further comprising providing at least one excluder lip in the seal, the at least one excluder lip operably coupled to the outer portion and contacting the inner portion.

6. The method of claim 1, further comprising providing a case skirt on the seal, the case skirt extending radially outwardly from, and generally perpendicular to the outer portion.

7. The method of claim 1, further comprising providing a second flange in the seal, the second flange extending radially inwardly from, and generally perpendicular to, the outside portion.

8. The method of claim 1, further comprising providing a wiper ring extending radially inwardly from an end of the faceplate to a location proximate the shaft.

9. The method of claim 6, further comprising crimping the faceplate to the case skirt.

10. The method of claim 1, further comprising providing a triple lip seal in the seal, the triple lip seal operably coupled to the outer portion and contacting the inner portion.

11. The method of claim 1, further comprising providing an elastomeric coating on an inner surface of the inner portion of the seal.

12. The method of claim 11, further comprising providing the elastomeric coating with a radial channel formed generally medial two ends of the inner portion.

13. The method of claim 1, further comprising providing an elastomeric coating on an outer surface of the outer portion of the seal.

14. The method of claim 13, further comprising providing an outer portion outside diameter relief channel in the elastomeric coating.

15. A method for sealing a dynamic shaft assembly containing a bore for receiving a seal, the method comprising:
- (a) providing a seal having
  - (i) a sleeve;
  - (ii) a casing;
  - (iii) a faceplate;
  - (iv) a first flange extending radially outwardly from and being generally perpendicular to an end of the sleeve; and
  - (v) at least one face lip operably coupled to an outside face of the first flange and extending radially inwardly towards and contacting the faceplate; and
- (b) placing the seal into the bore.

16. The method of claim 15, further comprising providing a second flange and a main sealing lip in the seal, the second flange extending radially inwardly from the casing, and the main sealing lip operably coupled to the second flange and contacting the sleeve.

17. The method of claim 15, further comprising providing a perimeter lip in the seal, the perimeter lip operably coupled to and extending radially outward from the first flange and contacting the casing.

18. A method for sealing a dynamic shaft assembly containing a bore for receiving a seal, the method comprising:
- (a) providing a seal having
  - (i) a sleeve;
  - (ii) a casing;
  - (iii) a faceplate;
  - (iv) a first flange extending radially outwardly from and being generally perpendicular to an end of the sleeve;
  - (v) a second flange extending radially inwardly from and being generally perpendicular to the casing;
  - (vi) a main sealing lip; and
  - (ix) at least one face lip operably coupled to an outside face of the first flange and extending radially inwardly towards and contacting the faceplate; and
- (b) placing the seal into the bore.

\* \* \* \* \*